(12) United States Patent
Okanobu

(10) Patent No.: US 7,509,106 B2
(45) Date of Patent: *Mar. 24, 2009

(54) TEST SIGNAL GENERATION CIRCUIT, AND RECEPTION CIRCUIT

(75) Inventor: Taiwa Okanobu, Tokyo (JP)

(73) Assignee: Sony Corporation (JP)

( * ) Notice: Subject to any disclaimer, the term of this patent is extended or adjusted under 35 U.S.C. 154(b) by 723 days.

This patent is subject to a terminal disclaimer.

(21) Appl. No.: 11/091,818

(22) Filed: Mar. 28, 2005

(65) Prior Publication Data

US 2005/0221776 A1    Oct. 6, 2005

(30) Foreign Application Priority Data

Apr. 6, 2004    (JP)    ............ P2004-111691

(51) Int. Cl.
*H04B 17/00*    (2006.01)
(52) U.S. Cl. .............. 455/226.1; 455/302; 455/226.4; 455/285
(58) Field of Classification Search .............. 455/226.1
See application file for complete search history.

(56) References Cited

U.S. PATENT DOCUMENTS 7,373,124 B2 *    5/2008    Okanobu .............. 455/226.1

FOREIGN PATENT DOCUMENTS

| JP | 61-107229 U | 7/1986 |
| JP | 07-007385 A | 1/1995 |
| JP | 09-238075 A | 9/1997 |
| JP | 2001-186039 A | 7/2001 |

OTHER PUBLICATIONS

Japanese Office Action issued in connection with corresponding Japanese Patent Application No. JP 2004-111691, issued on Sep. 5, 2007, pp. 1-3.

* cited by examiner

*Primary Examiner*—Duc Nguyen
*Assistant Examiner*—Ajibola Akinyemi
(74) *Attorney, Agent, or Firm*—Lerner, David, Littenberg, Krumholz & Mentlik, LLP

(57) ABSTRACT

A test signal generation circuit includes a tuning circuit, a local oscillation circuit for forming orthogonal local oscillation signals, first mixer circuits for frequency-converting the reception signal into IF signals by the local oscillation signals, IF-filters for extracting the IF signals from outputs of the first mixer circuits, phase shift circuits for shifting phases of the IF signals extracted by the IF-filters, a first calculation circuit for outputting an IF signal through addition/subtraction of outputs of the phase shift circuits, a forming circuit for forming orthogonal alternate current signals having a frequency equal to a frequency of the IF signals, second mixer circuits for receiving the orthogonal alternate current signals and the local oscillation signals, and a second calculation circuit for outputting a signal through addition/subtraction of outputs of the second mixer circuits, wherein an output of the second calculation circuit is supplied to the tuning circuit as a test signal.

7 Claims, 4 Drawing Sheets

| N | TEST MODE FOR AM RECEPTION | TEST MODE FOR FM RECEPTION |
|---|---|---|
| 6 | 30kHz | 60kHz |
| 7 | 35kHz | 70kHz |
| 8 | 40kHz | 80kHz |
| ⋮ | ….. | ….. |
| 11 | 55kHz | 110kHz |
| ⋮ | ….. | ….. |
| 25 | 125kHz | 250kHz |
| ⋮ | ….. | ….. |
| 80 | 400kHz | 800kHz | und # TEST SIGNAL GENERATION CIRCUIT, AND RECEPTION CIRCUIT

CROSS REFERENCES TO RELATED APPLICATIONS

The present invention contains subject matter related to Japanese Patent Application JP 2004-111691 filed in the Japanese Patent Office on Apr. 6, 2004, the entire contents of which being incorporated herein by reference.

BACKGROUND OF THE INVENTION

1. Field of the Invention

The present invention relates to a test signal generation circuit and a reception circuit having the test signal generation circuit.

2. Description of Related Art

In a super-heterodyne type receiver, the reception characteristics such as a reception sensitivity and image interference characteristics are degraded if the following frequency relations are not satisfied:

fRX=fLO−fIF . . . for medium wave broadcasting (AM broadcasting), and fRX=fLO+fIF . . . for FM broadcasting, wherein fRX: reception frequency, fLO: local oscillation frequency, and fIF: intermediate frequency.

A test signal generator is therefore provided for checking and adjusting the center frequency of an antenna tuning circuit, the center frequency of an intermediate frequency filter (hereinafter called "reception frequency and intermediate frequency" and the like).

This test signal generator can be configured by a PLL (Phase Locked Loop) circuit such as shown in FIG. 4. Namely, an oscillation signal at a stable frequency f1 is derived from a crystal oscillation circuit 1, thus derived oscillation signal is frequency-divided into a signal S1 having a 1/m (m is an integer of 2 or larger) in frequency by a frequency dividing circuit 2, and the signal S1 is supplied to a phase comparison circuit 3. Further, an oscillation signal S4 is derived from a VCO (Voltage Controlled Oscillator) 4, thus derived oscillation signal S4 is frequency-divided into a signal S5 having a 1/n (n is an integer of 2 or larger) in frequency by a frequency division circuit 5, and then the signal S5 is supplied to the phase comparison circuit 3.

The phase comparison circuit 3 compares the phase of the signal S2 as a reference frequency with the phase of the signal S5, thus obtained comparison output is supplied to a low-pass filter 6 to derive a DC (Direct Current) voltage having a level corresponding to the phase difference between the signals S2 and S5, and this DC voltage is supplied to the VCO 4 as a control signal.

In the normal state, therefore, the frequency of the signal S5 becomes equal to the frequency of the signal S2 so that the frequency f4 of the oscillation signal S4 is given by:

$$f4 = n/m \times f1.$$

The frequency f4 of the oscillation signal S4 can therefore be changed by changing the frequency dividing ratios of m and n. If the oscillation signal S4 is used as a test signal, it is possible to check and adjust the reception frequency and intermediate frequency by using the frequency f4 of the oscillation signal S4 as a reference. As a prior art document, there is Japanese Laid-Open Patent Application No. OP2000-13336.

SUMMARY OF THE INVENTION

It is necessary that the frequency of the test signal S4 can be changed in accordance with a frequency step of a reception frequency and an intermediate frequency. For example, since the frequency step of the middle wave broadcasting is 9 kHz, the frequency f4 of the test signal S4 is required to be changed also at a 9 kHz step in order to check and adjust the reception frequency with the test signal S4. In checking and adjusting the intermediate frequency, it is necessary to change the frequency f4 of the test signal S4 at a step of, for example, 5 kHz.

As the test signal S4 generated by the PLL circuit shown in FIG. 4 is used, the frequency to be used for the phase comparison at the phase comparison circuit 3 becomes low, for example, 5 kHz. When circuits are formed as an IC, with this low frequency, phase noises become larger and deteriorate C/N (Carrier to Noise) ratio, so that correct test results sometimes can not be obtained depending upon the test contents and objects to be tested. For example, it is not able to obtain correct results when checking attenuation amounts of a filter having a sharp attenuation characteristics, image interference and the like.

FIGS. 5A and 5B and FIGS. 6A and 6B illustrate how the measurement results of filter frequency characteristics and image interference characteristics change with a C/N ratio of the test signal S4. FIGS. 5A and 5B illustrate the measurement results of the frequency characteristics of an intermediate frequency filter. In FIG. 5A, a curve A is assumed to be the correct frequency characteristics of the intermediate frequency filter to be measured.

If the test signal S4 has a good C/N ratio as indicated by a solid line in FIG. 5A, and the frequency characteristics are measured by gradually changing its frequency, frequency characteristics B indicated by a solid line in FIG. 5B equal to the correct frequency characteristics A can be obtained. However, if the test signal S4 has a poor C/N ratio as indicated by a broken line in FIG. 5A, measurement results C indicated by a broken line in FIG. 5B broader than the correct frequency characteristics A are obtained due to the noise components of the test signal S4.

FIGS. 6A and 6B illustrate the measurement results of the image interference characteristics. In FIGS. 6A and 6B, a curve D is assumed to be a transfer characteristics of an antenna tuning circuit. If the test signal S4 has a good C/N ratio, as shown in FIG. 6A, a maximum output is obtained when the frequency of the test signal S4 is equal to a reception frequency fRX, whereas only a small output is obtained when the frequency of the test signal S4 is equal to an image frequency fIMG. A ratio of a signal level at the frequency fRX to a signal level at the frequency fIMG is an image attenuation amount (decibel).

However, if the test signal S4 has a poor C/N ratio, as shown in FIG. 6B, when the frequency of the test signal S4 is equal to the image frequency fIMG, the noise components of the test signal S4 locates in the pass band and its nearby area of the antenna tuning circuit, so that an oblique line portion shown in FIG. 6B is also outputted as the image components. The correct image attenuation amount cannot therefore be measured.

As described above, if the C/N ratio of the test signal S4 is poor, the correct measurement results may not be obtained depending upon the test contents and objects to be tested. In a so-called low IF type receiver among others, the local oscillation frequency fLO is set near the reception frequency fRX, and the intermediate frequency fIF is set much lower than the reception frequency fRX, so that the influence of the phase noises near the carrier is large and the optimum adjustment cannot be made.

The present invention intends to solve the above-described problems.

A test signal generation circuit of the present invention comprises: a tuning circuit for picking up a reception signal having a desired frequency; a local oscillation circuit for forming a pair of orthogonal local oscillation signals; a pair of first mixer circuits for frequency-converting the reception signal into a pair of intermediate frequency signals by using the pair of local oscillation signals; a pair of intermediate frequency filters for extracting the pair of intermediate frequency signals from output signals of the pair of first mixer circuits; a pair of phase shift circuit for shifting phases of the pair of intermediate frequency signals extracted by the pair of intermediate frequency filters; a first calculation circuit for outputting an intermediate frequency signal through addition or subtraction of output signals of the pair of phase shift circuits; a signal forming circuit for forming a pair of orthogonal alternate current signals having a frequency equal to an intermediate frequency of the pair of intermediate frequency signals; a pair of second mixer circuits for receiving the pair of alternate current signals and the pair of local oscillation signals; and a second calculation circuit for outputting a signal having a desired frequency of an image frequency through addition or subtraction of outputs of the pair of second mixer circuits, wherein an output signal of the second calculation circuit is supplied to the tuning circuit as a test signal.

DESCRIPTION OF THE PREFERRED EMBODIMENT (1) Reception Circuit 10

Figure 1:
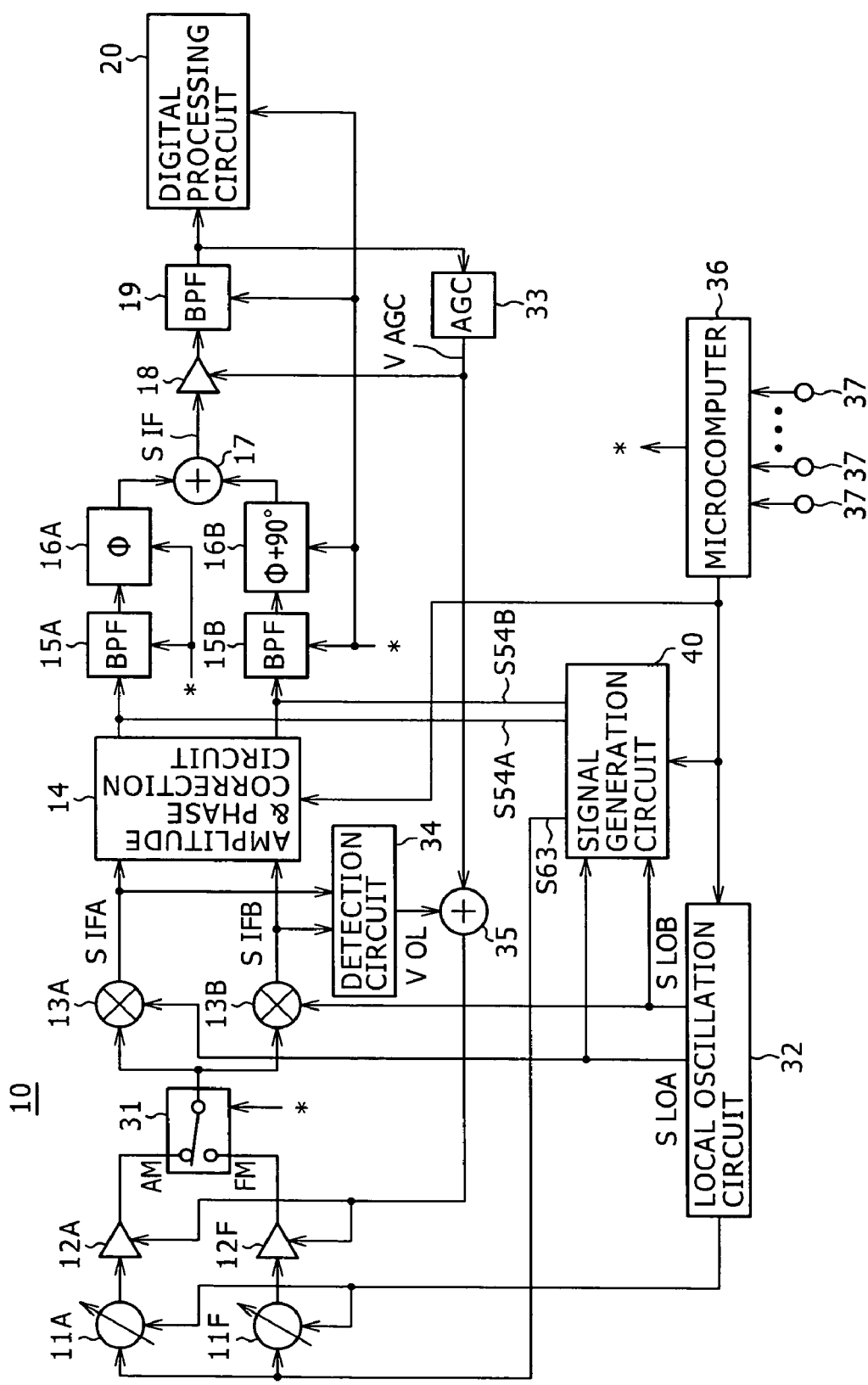
FIG. 1 is a block diagram of a reception circuit according to an embodiment of the invention.

FIG. 1 is a block diagram showing an example of a reception circuit 10 of a receiver for AM broadcasting (middle wave broadcasting) and FM broadcasting to which the present invention is applied. This reception circuit 10 is of a so-called low IF type in which an intermediate frequency is set much lower than a reception frequency by setting a local oscillation frequency near to the reception frequency. A reception signal is frequency-converted into a pair of orthogonal intermediate frequency signals, and the image characteristics are improved by a phase processing.

Namely, during AM broadcasting reception, a reception signal SRX having a desired frequency (target reception frequency) is picked up from an electronic tuning type antenna tuning circuit 11A, and this reception signal SRX is supplied to a pair of mixer circuits 13A and 13B through a high frequency amplifier 12A and a band switching circuit 31.

During FM broadcasting reception, a reception signal SRX having a desired frequency is picked up from an electronic tuning type antenna tuning circuit 11F, and this reception signal SRX is supplied to the pair of mixer circuits 13A and 13B through a high frequency amplifier 12F and the band switching circuit 31.

A local oscillation circuit 32 is configured with a PLL circuit which generates two signals SLOA and SLOB having phases different by 90° to each other and a frequency near to the frequency of the reception signal SRX. The signals SLOA and SLOB are supplied as local oscillation signals to the mixer circuits 13A and 13B, respectively. For example, a frequency fLO of the local oscillation signals SLOA and SLOB is set to a frequency higher than the reception frequency fRX by 55 kHz during AM broadcasting reception, and to a frequency lower than the reception frequency by 250 kHz during FM broadcasting reception.

The mixer circuits 13A and 13B convert the frequency of the reception signal SRX of AM broadcasting or FM broadcasting into a pair of intermediate frequency signals SIFA and SIFB by using the local oscillation signals SLOA and SLOB, respectively. In this case, each of the intermediate frequency signals SIFA and SIFB contains signal components of a desired frequency (target signal components) and signal components of an image frequency. For the purposes of simplicity, in the following description, the signal components of the desired frequency are called as the intermediate frequency signals SIFA and SIFB, and the signal components of the image frequency are called as the image components.

Since the local oscillation signals SLOA and SLOB have a phase difference of 90°, the intermediate frequency signals SIFA and SIFB are orthogonal to each other with a phase difference of 90°, and the image components are orthogonal to each other with a phase difference of 90° in the opposite relation to the intermediate frequency signals SIFA and SIFB.

A portion of a control voltage to be applied to a variable capacitor diode of a VCO (not shown) in a PLL circuit is derived from the PLL circuit constituting the local oscillation circuits 32, and this control voltage is supplied as a tuning voltage to the tuning circuits 11A and 11F to tune in the reception signal SRX.

The intermediate frequency signals SIFA and SIFB (and image components) from the mixer circuits 13A and 13B are supplied to an amplitude and phase correction circuit 14 which corrects a relative amplitude error and phase error of the intermediate frequency signals SIFA and SIFB. The error-corrected intermediate frequency signals SIFA and SIFB are supplied to phase shift circuits 16A and 16B through band-pass filters 15A and 15B constituting intermediate frequency filters. The phase shift circuits 16A and 16B shift the phases, for example, in such a manner that the intermediate frequency signals SIFA and SIFB have the same phase and the image components have opposite phases. The intermediate frequency signals SIFA and SIFB after phase shift are supplied to an calculation circuit 17 and added together. An intermediate frequency signal SIF canceling out the image components is outputted from the calculation circuit 17.

Next, the intermediate frequency signal SIF is supplied through an intermediate frequency amplifier 18 and a band-pass filter 19 to a digital processing circuit 20 which converts the intermediate frequency signal by A/D (Analog to Digital) conversion and executes a predetermined digital processing corresponding to the format of the reception signal SRX to output an audio signal.

The amplifiers 12A, 12F and 18 are made of variable gain amplifiers. A portion of the intermediate signal SIF from the band-pass filter 19 is supplied to an AGC (Automatic Gain Control) voltage generating circuit 33 which generates an AGC voltage VAGC. The AGC voltage VAGC is supplied to the amplifier 18 as a gain control signal to perform an AGC operation at the intermediate frequency stage. The AGC voltage VAGC is also supplied through an addition circuit 35 to the high frequency amplifiers 12A and 12F as a gain control signal to perform an AGC operation at the high frequency stage.

The intermediate frequency signals SIFA and SIFB output from the mixer circuits 13A and 13B are also supplied to an excessive input detection circuit 34 which generates an AGC voltage VOL when a reception level becomes too high.

This AGC voltage VOL is supplied through the addition circuit 35 to the high frequency amplifiers 12A and 12F as a gain control signal to conduct delayed AGC at the high frequency stage. The reception circuit 10 described above is fabricated in one chip IC (Integrated Circuit), excepting the tuning circuits 11A and 11F and a resonance circuit in the local oscillation circuit 31 and the digital processing circuit 20. The digital processing circuit 10 is also fabricated in the same one chip IC.

A microcomputer 36 is provided as a system control circuit. Operation switches 37 such as a tuning switch is connected to the microcomputer 36. For example, when a power is turned on, the microcomputer 36 supplies a correction control signal to the amplitude and phase correction circuit 14 which is controlled, as described earlier, in such a manner that the image components contained in the intermediate frequency signals SIFA and SIFB are made to have the same amplitude and opposite phases so that the calculation circuit 17 can cancel out the image components.

As a band switching switch of the operation switches 37 is operated, the microcomputer 36 supplies a control signal to the switching circuit 31 which takes a state shown in FIG. 1 or an opposite state to enter a reception mode of AM broadcasting or FM broadcasting. At this time, the microcomputer 36 supplies a signal representative of the reception mode to the circuits 15a, 15B, 16A, 16B, 19, 20 and 32 to change the characteristics of these circuits for reception of AM broadcasting or FM broadcasting.

As the tuning switch of the operation switches 37 is operated, the microcomputer 36 supplies a predetermined control signal to the local oscillation circuit 32 to change the oscillation frequency of the local oscillation signals SLOA and SLOB to thus change the reception frequency fRX to the desired frequency. AM and FM broadcasting at an arbitrary frequency can therefore be received.

(2) Test Signal Generation Circuit 40

(2-1) Structure of Test Signal Generation Circuit 40

In the present invention, the receiver has a built-in test signal generation circuit 40 and prepares an AM reception test mode and an FM reception test mode. In the AM reception test mode and FM reception test mode, the reception circuit 10 enters a reception mode of AM broadcasting and FM broadcasting, respectively.

Figure 2:
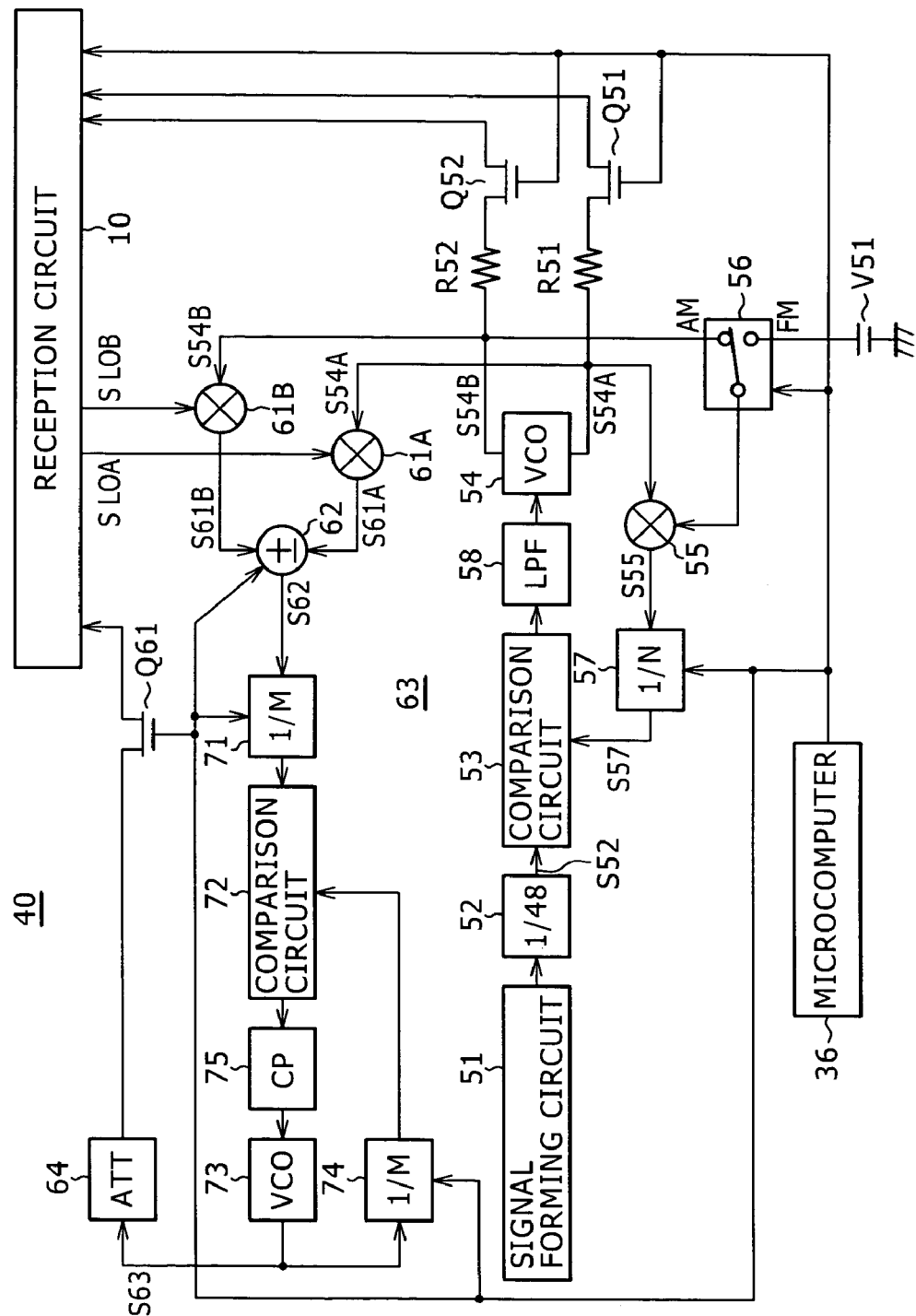
FIG. 2 is a block diagram of a test signal generation circuit according to an embodiment of the present invention.

FIG. 2 shows an example of the test signal generation circuit 40. The test signal generation circuit 40 has a PLL 50 which outputs an AC (Alternate Current) signal having the intermediate frequency fIF. Namely, a signal forming circuit 51 is made of, for example, a crystal oscillation circuit. The signal forming circuit 51 outputs an AC signal having a predetermined stable frequency, e.g., 480 kHz, to a frequency dividing circuit 52 which divides the frequency into a signal S52 having a 1/48 in frequency, i.e., a frequency of 10 kHz. This signal S52 is supplied to a phase comparison circuit 53 as its reference signal.

A VCO 54 is also provided to output a pair of oscillation signals S54A and S54B having a predetermined frequency and different phases shifted by 90°. In this case, although it will become apparent later, in the normal state, the frequency of the oscillation signals S54A and S54B is equal to the intermediate frequency fIF (=55 kHz or 250 kHz) in the reception circuit 10. If the local oscillation signals SLOA and SLOB in the reception circuit 10 are given by:

$$SLOA=\sin(2\pi \times fLO \times t) \quad (1A)$$

$$SLOB=\cos(2\pi \times fLO \times t) \quad (1B)$$

then the oscillation signals S54A and S54B have the following phase relations:

$$S54A=\cos(2\pi \times fIF \times t) \quad (2A)$$

$$S54B=\sin(2\pi \times fIF \times t) \quad (2B)$$

The oscillation signal S54A is supplied to a multiplier circuit 55, and the oscillation signal S54B is supplied to a switching circuit 56. A DC voltage V51 equal to the DC level of the signals S54A and S54B is also applied to the switching circuit 56. Further, the switching circuit 56 is connected to a state as shown in FIG. 2, and is connected to in an opposite to the state shown in FIG. 2 in the FM reception test mode by the microcomputer 36, and thereby, an output from the switching circuit 56 is supplied to the multiplier circuit 55.

In the AM reception test mode, since the oscillation signals S54A and S54B are supplied to the multiplier circuit 55, the multiplier circuit 55 outputs a signal S55 having a frequency of 2×fIF of the oscillation signals S54A and S54B. In the FM reception test mode, since the oscillation signal S54A and the DC voltage V51 are supplied to the multiplier circuit 55, the multiplier circuit 55 outputs the signal S55 having the frequency fIF of the oscillation signal S54A.

This signal S55 is supplied to a variable frequency dividing circuit 57 which 25 divides the frequency into a frequency-divided signal S57 having a 1/N in frequency.

This signal S57 is supplied to the phase comparison circuit 53. A frequency dividing ratio N is set by the microcomputer 36 as in the following:

N=11 . . . in AM reception test mode

N=25 . . . in FM reception test mode

By using the frequency of the frequency-divided signal S52 as a reference, the phase comparison circuit 53 compares the phase of the signal S57 with that of the signal S52, and a comparison output is supplied to a low-pass filer 58 which outputs a DC voltage having a level corresponding to the phase difference between the signals S57 and S52. This voltage is supplied to the VCO 54 as its control signal.

During the normal operation, since the frequency-divided signals S52 and S57 applied to the phase comparison circuit 53 are equal, f52 and f54 in the AM reception test mode are given by:

$$f52 = f54 \times 2/N, \text{ and accordingly}$$

$$f54 = f52 \times N/2$$

$$= 10 \text{ kHz} \times 11/2$$

$$= 55 \text{ kHz}$$

$$= \text{intermediate frequency } fIF \text{ in the AM}$$

broadcasting reception mode, where:

f52: frequency of frequency-divided signal S52=10 kHz f54: oscillation frequency of VCO 54.

In the FM reception test mode, since f52=f54/N;

$$f54 = f52 \times N$$
$$= 10 \text{ kHz} \times 25$$
$$= 250 \text{ kHz}$$
$$= \text{intermediate frequency } fIF \text{ in the FM broadcasting reception mode.}$$

Namely, the frequency of the oscillation signals S54A and S54B of the VCO 54 becomes, in the AM reception test mode, equal to the intermediate frequency fIF in the AM broadcasting reception mode, and in the FM reception test mode, equal to the intermediate frequency fIF in the FM reception test mode.

The oscillation signals S54A and S54B are supplied to mixer circuits 61A and 61B, and the local oscillation signals SLOA and SLOB output from the local oscillation circuits 32 of the reception circuit 10 are also supplied to the mixer circuits 61A and 61B. Output signals S61A and S61B from the mixer circuits 61A and 61B are supplied to a calculation circuit 62.

In this case, the frequencies and phases of the local oscillation signals SLOA and SLOB are given by the equations (1A) and (1B) and the frequencies and phases of the oscillation signals S54A and S54B are given by the equations (2A) and (2B).

Therefore, the following equations are established:

$$2 \times S61A = 2 \times SLOA \times S54A \quad (3A)$$
$$= \sin(2\pi \times (fLO + fIF) \times t) +$$
$$\sin(2\pi \times (fLO - fIF) \times t)$$

$$2 \times S61B = 2 \times SLOB \times S54B \quad (3B)$$
$$= \sin(2\pi \times (fLO + fIF) \times t) -$$
$$\sin(2\pi \times (fLO - fIF) \times t)$$

When the signal 61A is added to the signal S61B by the calculation circuit 62, its output signal S62 can be expressed from the equations (3A) and (3B) as:

$$2 \times S62 = 2 \times (S61A + S61B) = \sin(2\pi \times (fLO + fIF) \times t) \quad (4)$$

When the signal 61B is subtracted from the signal S61A by the calculation circuit 62, its output signal S62 can be expressed as:

$$2 \times S62 = 2 \times (S61A - S61B) = \sin(2\pi \times (fLO + fIF) \times t) \quad (5)$$

The signal S62 shown in the equation (4) is the image frequency fIMG in the AM broadcasting reception mode or the reception frequency fRX (desired frequency) in the FM broadcasting reception mode. The signal S62 shown in the equation (5) is the reception frequency fRX (desired frequency) in the AM broadcasting reception mode or the image frequency fIMG in the FM broadcasting reception mode.

The microcomputer 36 supplies the calculation circuit 62 with a control signal indicative of addition or subtraction so that the signal S62 shown in the equation (4) or (5) is output from the calculation circuit 62.

This output signal S62 is supplied to a PLL filter 63 which outputs a signal S63 with unnecessary components being eliminated.

Namely, the output signal S62 from the calculation circuit 62 is supplied to a variable frequency division circuit 71 which divides the frequency into a frequency-divided signal having a 1/M in frequency. The frequency-divided signal is supplied to a phase comparison circuit 72 as its reference signal. An oscillation signal S63 of a VCO 73 is supplied to a variable frequency dividing circuit 74 which divides the frequency into a frequency-divided signal having a frequency of 1/M. This frequency-divided signal is supplied to the phase comparison circuit 72. The microcomputer 36 sets the frequency dividing ratio to M=1 in the AM reception test mode, and to M=8 in the FM reception test mode.

An comparison output of the phase comparison circuit 72 is supplied through a low-pass filter 75 to the VCO 73 as its control signal. Therefore, the frequency of the oscillation signal S63 of the VCO 73 is equal to the frequency of the output signal S62, and the oscillation signal S63 has a higher purity than that of the signal S62.

This signal S63 is supplied to an attenuator circuit 64 to make it have a predetermined level. The source-drain path of an FET Q61 as a switching circuit is connected between an output terminal of the attenuator circuit 64 and the antenna tuning circuits 11A and 11F of the reception circuit 10. The microcomputer 36 applies a predetermined control signal to the gate of FET S61.

The oscillation signals S54A and S54B from the VCO 54 are applied to one ends of level adjusting resistors R51 and R52. The source-drain paths of an FET Q51 and an FET Q52 as a switching circuit are connected between other ends of the resistors R51 and R52 and the input terminals of the band-pass filters 15A and 15B of the reception circuit 10, respectively. The microcomputer 36 applies predetermined control signals to the gates of FETs Q51 and Q52.

This test signal generation circuit 40 is fabricated in one chip IC together with the reception circuit 10 excepting some circuits as described earlier.

(2-2) Operation and Use Method

The following operations and processes are performed when a reception frequency, an intermediate frequency and the like of the reception circuit 10 are adjusted by using the test signal generation circuit 40.

(2-2-1) Check and Adjustment of AM Reception Frequency

In this case, the operation switches 37 are operated to set the reception circuit 10 to the AM broadcasting reception mode, and the test signal generation circuit 40 to the AM reception test mode. The microcomputer 36 supplies control signals to set the operation circuit 62 to a subtraction mode and to turn FET Q61 on and FETs Q51 and Q52 off.

The calculation circuit 62 therefore outputs the subtraction signal S62 shown in the above-described equation (5). This signal S62 is supplied as a test signal through the attenuator circuit 64 and FET Q61 to the antennal tuning circuit 11A of the reception circuit 10.

It is, therefore, possible to check and adjust the reception frequency, i.e., the center frequency of the antenna tuning circuit 11A. The frequency of the test signal S62 can be changed to an arbitrary frequency at the frequency step of AM broadcasting, because the microcomputer 36 changes the local oscillation frequency fLO of the local oscillation circuit 32.

(2-2-2) Check of AM Reception Image Interference Characteristics

In this case, in the state of (2-2-1), the process of the calculation circuit 62 is changed to an addition mode. The calculation circuit 62 therefore outputs the addition signal S62 shown in the above-described equation (4). This signal S62 is supplied as a test signal to the antennal tuning circuit 11A of the reception circuit 10. It is therefore possible to check the image interference characteristics.

(2-2-3) Check and Adjustment of AM Reception Intermediate Frequency

In this case, in the state of (2-2-1), the microcomputer 36 supplies control signals to turn FET Q61 off and FETs Q51 and Q52 on. The oscillation signals S54A and S54B of VCO 54 are therefore supplied through FET2 Q51 and Q52 to the band-pass filters 15A and 15B of the reception circuit 10 as test signals.

Figures 3, 4:
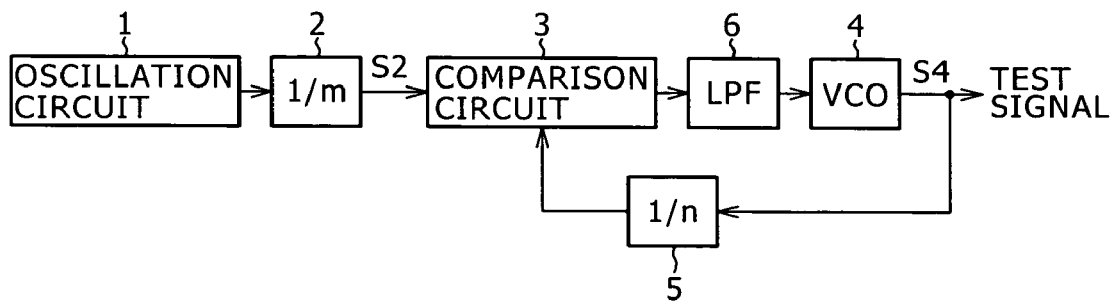
FIG. 3 is a table showing test modes of AM reception and FM reception.
FIG. 4 is a block diagram of a PLL circuit.
Figure 5A:
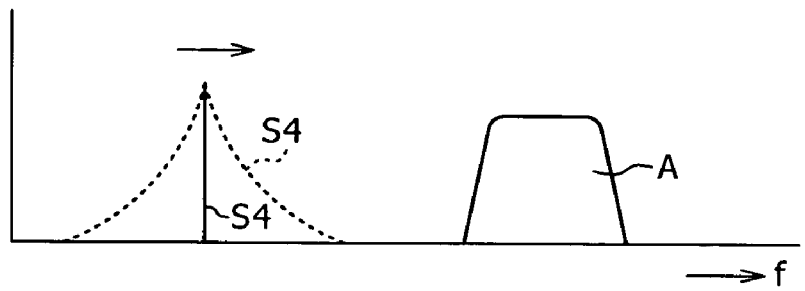
FIGS. 5A and 5B illustrate the measurement results of filter frequency characteristics.
Figure 5B:
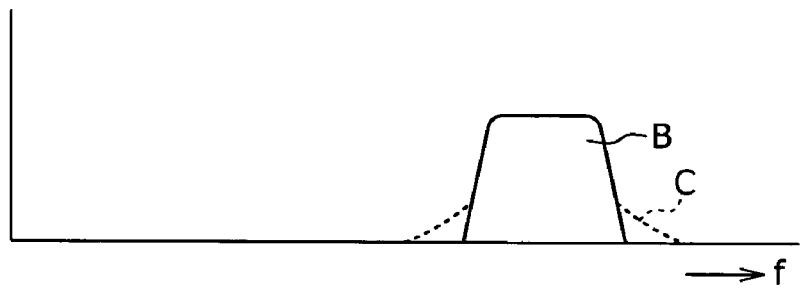
Figure 6A:
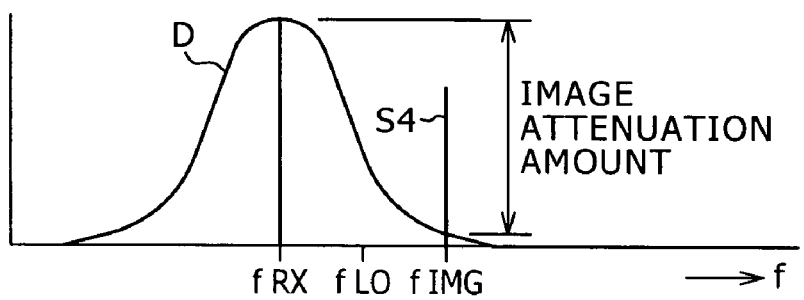
FIGS. 6A and 6B illustrate the measurement results of image interference characteristics.
Figure 6B:
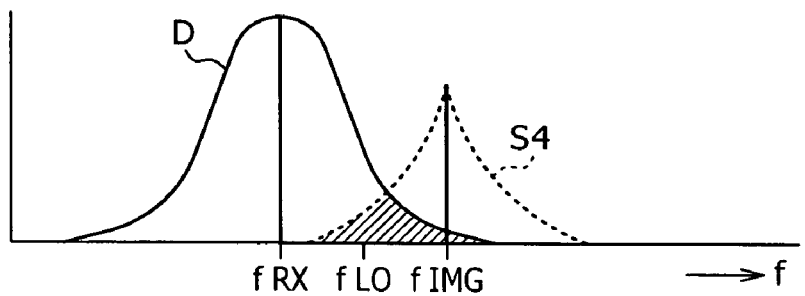

In this case, the frequency f54 of the oscillation signals S54A and S54B is equal to a normal intermediate frequency fIF in the AM reception mode. The microcomputer 36 changes the frequency dividing ratio N of the variable frequency division circuit 57, e.g., incrementing by 1 in the range of N=3 to 80, so that the frequency f54 of the oscillation signal S54B can be changed at a step of 5 kHz as shown in FIG. 3.

It is therefore possible to check and adjust the frequency f54 of the oscillation signals S54A and S54B, i.e., the center frequencies of the intermediate frequency filters 15A, 15B and 19.

(2-2-4) Check and Adjustment of FM Reception

In this case, the operation switches 37 are operated to set the reception circuit 10 to the FM broadcasting reception mode, and the test signal generation circuit 40 to the FM reception test mode.

The microcomputer 36 supplies control signals to set the operation circuit 62 to an addition or subtraction mode and to turn FET Q61 on and FETs Q51 and Q52 off, or conversely to turn FET Q61 off and FETs Q51 and Q52 on. Under these conditions, similar to the above-described AM reception check and adjustment, it is possible to check and adjust the FM reception frequency and intermediate frequency and to check the image interference characteristics.

During the intermediate frequency check and adjustment, the frequency f54 of the oscillation signals S54A and S54B can be changed at a step of 10 kHz as shown in FIG. 3.

(3) Summary

With the above-described test signal generation circuit 40, a test signal necessary for the check and adjustment of the receiver can be generated. In this case, since the signal S62 from which the test signal S63 is generated is formed by shifting, by an amount of the intermediate frequency, the frequency fLO of the local oscillation signals SLOA and SLOB supplied from the reception circuit 10, the frequency of the test signal S63 can be changed at the frequency step of AM or FM broadcasting by changing the frequency FLO of the local oscillation signals SLOA and SLOB.

The check and adjustment of the AM reception intermediate frequency, i.e., the check and adjustment of the center frequencies of the band-pass filters 15A, 15B and 19, are performed by using the test signal S63 at a 5 kHz step. Even in this case, since the phase comparison at the phase comparison circuit 53 is performed by using the signal S52 having a frequency of 10 kHz, the loop bandwidth of the PLL circuit 50 can be broadened and phase noises can be suppressed low.

For the check and adjustment of the AM and FM reception frequencies, the test signal S63 is formed by frequency-converting the oscillation signals S54A and S54B of the PLL circuit 50 by using the local oscillation signals SLOA and SLOB. Therefore, even if the signals S54A and S54B contain phase noises, the bandwidth occupied by phase noises in the test signal S63 remains narrow so that this test signal can be used without any practical problem.

The PLL circuit 50 generates the oscillation signals S54A and S54B having the intermediate frequency fIF, and the test signal S63 is formed by frequency-converting the oscillation signals S54A and S54B by using the local oscillation signals SLOA and SLOB. Therefore, the frequency of the test signal S63 can be changed at the frequency step of the reception frequency for both AM and FM broadcasting reception bands. From the same reason, as the reception frequency fRX is set to the frequency at which the check is performed, the frequency of the test signal S63 automatically follows and is set to the frequency at which the check or adjustment is performed. A labor required for settings is therefore small and the check and adjustment can be performed quickly.

The test signal S63 is formed by passing the signal S62 output from the calculation circuit 62 through the PLL filter 63. Therefore, the test signal S63 can be made highly pure by setting the loop frequency bandwidth of the PLL filter 63 to a value which is sufficiently small as compared to the intermediate frequency fIF and is not influenced by phase noises. For example, if the intermediate frequency fIF is 50 kHz, a difference between the reception frequency fRX and image frequency is 100 kHz so that an attenuation of 30 dB or higher can be obtained at the loop bandwidth of about 10 kHz.

It is therefore possible to perform check and adjustment more properly, or properly even for a reception circuit having superior characteristics. In particular, since the reception circuit 10 cancels out the image components by utilizing the phase difference between the intermediate frequency signals SIFA and SIFB, the test signal S63 has a high purity so that the check and adjustment of the image interference characteristics can be performed more properly.

The output signal S62 of the calculation circuit 62 may be supplied as the test signal to the antenna tuning circuits 11A and 11F through the attenuator circuit 64. If a poly-phase filter is used, extraction and phase shift of the intermediate frequency signal can be realized at the same time. The band-pass filer 15A and phase shift circuit 16A may be constituted of a first poly-phase filter and the band-pass filer 15B and phase shift circuit 16B may be constituted of a second poly-phase filter.

According to the present invention, the test signal necessary for the check and adjustment of a reception circuit can be formed easily. The test signal having less phase noises in a broad variable frequency band can be obtained. Since the test signal having a high purity can be obtained, proper check and adjustment are possible and even a reception circuit having excellent characteristics can be adjusted.

What is claimed is:

1. A test signal generation circuit comprising:
   a tuning circuit for picking up a reception signal having a predetermined frequency;
   a local oscillation circuit for forming a pair of orthogonal local oscillation signals;
   a pair of first mixer circuits for frequency-converting the reception signal into a pair of intermediate frequency signals by using the pair of orthogonal local oscillation signals;
   a pair of intermediate frequency filters for extracting the pair of intermediate frequency signals from output signals of the pair of first mixer circuits;
   a pair of phase shift circuits for shifting phases of the pair of intermediate frequency signals extracted by the pair of intermediate frequency filters;
   a first calculation circuit for outputting an intermediate frequency signal through addition or subtraction of output signals of the pair of phase shift circuits;

a signal forming circuit for forming a pair of orthogonal alternate current signals having a frequency equal to an intermediate frequency of the pair of intermediate frequency signals;

a pair of second mixer circuits for receiving the pair of orthogonal alternate current signals and the pair of orthogonal local oscillation signals; and a second calculation circuit for outputting a signal having a predetermined frequency of an image frequency by addition or subtraction of outputs of the pair of second mixer circuits, wherein an output signal of the second calculation circuit is supplied to the tuning circuit as a test signal.

2. The test signal generation circuit as cited in claim 1, further comprising:

a PLL, wherein a signal having a frequency equal to the frequency of the output signal from the second calculation circuit is outputted as the test signal by supplying the output signal of the second calculation circuit to the PLL.

3. The test signal generation circuit as cited in claim 1, or claim 2, wherein the pair of alternate current signals is supplied to the pair of orthogonal intermediate frequency filters.

4. A reception circuit comprising:

a tuning circuit for picking up a reception signal having a predetermined frequency;

a local oscillation circuit for forming a pair of orthogonal local oscillation signals;

a pair of first mixer circuits for frequency-converting the reception signal into a pair of intermediate frequency signals by using the pair of orthogonal local oscillation signals;

a pair of intermediate frequency filters for extracting the pair of intermediate frequency signals from output signals of the pair of first mixer circuits;

a pair of phase shift circuits for shifting phases of the pair of intermediate frequency signals extracted by the pair of intermediate frequency filters;

a first calculation circuit for outputting an intermediate frequency signal through addition or subtraction of output signals of the pair of phase shift circuits;

a signal forming circuit for forming a pair of orthogonal alternate current signals having a frequency equal to an intermediate frequency of the pair of orthogonal intermediate frequency signals;

a pair of second mixer circuits for receiving the pair of orthogonal alternate current signals and the pair of local oscillation signals; and a second calculation circuit for outputting a signal having a desired frequency of an image frequency by addition or subtraction of outputs of the pair of second mixer circuits, wherein an output signal of the second calculation circuit is supplied to the tuning circuit as a test signal.

5. The reception circuit as cited in claim 4, further comprising:

a PLL, wherein a signal having the same in frequency of the output signal from the second calculation circuit is outputted as the test signal by supplying the output signal of the second calculation circuit to the PLL.

6. The reception circuit as cited in claim 4, or claim 5, wherein the pair of orthogonal alternate current signals is supplied to the pair of intermediate frequency filters.

7. The reception circuit as cited in claim 4, or claim 5, wherein the whole reception circuit is fabricated in a form of a one-chip IC except the tuning circuit.

* * * * *